3,547,949
BENZOTHIOPYRONE COMPOUNDS
Charles Malen, Fresnes Village, and Pierre Desnoyers, Fontenay - aux - Roses Village, France, assignors to Societe en nom Collectif Science Union et Cie, Suresnes, France, a French society
No Drawing. Filed Oct. 6, 1967, Ser. No. 673,276
Claims priority, application Great Britain, Oct. 26, 1966, 48,046/66
Int. Cl. C07d 65/14
U.S. Cl. 260—327       6 Claims

ABSTRACT OF THE DISCLOSURE

Benzothiopyr-4-one compounds substituted: in position 5, 6, 7 or 8, by at least one, and at most three, hydroxyl groups and, optionally, in position 2 or 3, by lower-alkyl having up to five carbon atoms, inclusive.

These compounds reduce the permeability and increase the resistance of the capillary vessels and are accordingly useful in the treatment of capillary brittleness.

---

The present invention provides compounds of benzothiopyrone of the general Formula I

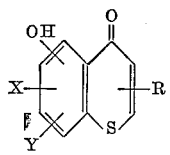

(I)

in which R represents a hydrogen atom or a lower-alkyl radical containing up to 5 carbon atoms, inclusive, in a linear or branched chain, and X and Y each represent a hydrogen atom or a hydroxyl group. The present invention also includes the salts of the abovementioned compounds.

The products of the above general formula and their physiologically tolerable salts possess valuable pharmacological and therapeutic properties. They reduce the permeability and raise the resistance of the capillary vessels. Accordingly, the invention also provides pharmaceutical preparations which comprise a compound of the general Formula I or a physiologically tolerable salt thereof in admixture or conjunction with a pharmaceutically suitable carrier, and a method of treating capillary brittleness with the said compounds.

The new compounds may be prepared by demethylation of a methoxy compound corresponding to the general Formula II:

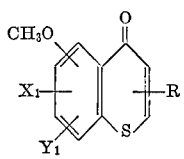

(II)

in which R has the meaning defined above, and $X_1$ and $Y_1$ each represent a hydrogen atom or a methoxy group.

Advantageously, the dealkylating agent used is azeotropic hydriodic acid stabilized with 6% by volume of aqueous hypophosphorous acid of 50% strength, or azeotropic aqueous hydrobromic acid.

The alkoxylated compounds of the general Formula II may be prepared by the process described by F. Krollpfeiffer et al., Ber., 56, 1819–24 (1923) and 58, 1654–76 (1925), including cyclization of an alkoxyphenyl-thiobeta-propionic acid or a derivative thereof by means of a conventional cyclizing agent, for example, sulphuric acid or aluminium chloride, followed by halogenation and treatment of the halogenated compound thus obtained with an amine such, for example, as pyridine.

It has been observed that these alkoxylated compounds can be prepared in a very advantageous manner by carrying out the cyclization of the alkoxyphenyl-thio-beta-propionic acid with trifluoro acetic anhydride. The main value of such procedure is that it makes possible an extremely rapid cyclization under very mild working conditions.

The alkoxylated compounds of the general Formula II are also obtainable by the process described by F. Montanari and A. Negrini in Ricerca Scientifica, 27, 3055–59 (1957), including chlorination of a beta-arylmercaptoacrylic acid by means of thionylchloride and cyclization of the beta-arylmercaptoacrylic chloride by a conventional cyclizing agent such, for example, as aluminium chloride.

The new compounds thus obtained are generally in the form of light yellow or light chamois coloured crystals which are insoluble in water and at best only partially soluble in most of the usual organic solvents, except in the case when R represents an alkyl radical which contains more than two carbon atoms, in which case solubility in solvents is increased.

The new compounds are very stable in alkaline media and in concentrated aqueous mineral acids. The compounds are amphoteric and form very strongly basic alkali metal salts, as well as salts with strong mineral acids, which acid salts can be hydrolyzed with water. All these compounds react like monoacids towards tetrabutyl ammonium hydroxide in pyridine solution.

If desired, the new compounds may be purified by any of the conventional physical or chemical methods. They have a high melting point except when R represents an alkyl radical containing more than two carbon atoms. These melting points, determined under a microscope on a heater (Kofler heater), have only a minor physical significance, since the melting often occurs with sublimation or decomposition. On the other hand the infrared spectra, taken in a mineral oil suspension or mull (Nujol-TM) on a standard spectrophotometer (e.g., a Perkin 221-TM) are relatively characteristic.

The absorption band attributable to the carbonyl group is always of very little intensity and is often obtained merely as a simple shoulder between 1620 and 1600 cm.$^{-1}$.

The hydroxyl groups, on the other hand, give very characteristic absorption schemes.

With the monohydroxylated compounds, the hydroxyl function in the 6-position gives an absorption band of the hydroxy polymers centered towards 3320–3350 cm.$^{-1}$, whereas the hydroxyl function in the 7-position produces a large massing of absorption bands of the hydroxypolymers and the hydroxychelates between 3400 and 2500 cm.$^{-1}$, and the hydroxyl function in the 8-position produces a large absorption massing of the hydroxychelates between 2750 and 2200 cm.$^{-1}$.

With the dihydroxylated compounds, the hydroxyl functions in the 6- and 7-positions produce a narrow band towards 3500 cm.$^{-1}$ of free hydroxyl and a large massing of the hydroxychelates between 2700 and 2200 cm.$^{-1}$, and the hydroxyl functions in the 5- and 8-positions produce a very large absorption massing of the hydroxypolymers and chelates between 3500 and 2400 cm.$^{-1}$.

With the trihydroxylated compounds, the hydroxyl functions in the 6-, 7- and 8-positions produce a narrow band of free hydroxyl at 3530 cm.$^{-1}$, a considerable massing of hydroxypolymers centered towards 3130 cm.$^{-1}$ and a small amount of intense massing between 2800 and 2300 cm.$^{-1}$.

Moreover, the constant presence of two intense complex bands on either side of 1550 cm.$^{-1}$ is characteristic of this kind of product.

The pharmacological study of the new compounds of the present invention has given the following results:

The toxicity is very low and the $LD_{50}$, studied by oral administration in mice, varies from 2,000 to 10,000 mg./kg.

The activity on the capillary permeability was studied in rabbits as per the test of Ambrose and Eds [J. Pharm. Exp. Therap., 90, 359 (1947)]. It was noted that the new compounds, administered orally or intraperitoneally at a dose of 50 to 300 mg./kg., delay from 32 to 620% the appearance of the blue coloration on the depilated abdomen skin of the rabbit, after an injection of 2 cm.$^3$ of 1% trypan blue.

Parrot's method was used to measure the capillary resistance [C. R. Soc. Biol., 140, 750 (1946)]. It was found that compounds of the present invention, administered to the guinea-pig at a dose of 50 mg./kg. by the I.P. route, increase considerably the capillary resistance and are able to protect the animals against the consequences of a diet deficient in $C_2$ factor.

The hereinabove described properties permit the use of the new compounds in human or animal therapy, especially in the treatment of the capillary brittleness.

The compounds of the invention can be administered in various pharmaceutical forms in association with different pharmaceutical solid or liquid carriers such, for example, as distilled water, glucose, lactose, talc, gum-arabic, magnesium stearate and others.

The human doses may vary from 10 to 100 mg. in parenteral, rectal or oral administration, with small animal dosages being less and large animal dosages being about the same or even greater.

The following examples illustrate the invention, but are not to be construed as limiting.

EXAMPLE 1

2-methyl-6-hydroxy-benzothiopyr-4-one

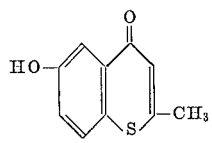

Seven grams of 2-methyl-6-methoxy-benzothiopyr-4-one (melting at 101.5–103° C.) are added to 70 ml. of redistilled and stabilized azeotropic hydriodic acid. The mixture is refluxed for 3 hours. After cooling, a crystalline, orange-colored magma is obtained. The bulk of the hydriodic acid is evaporated under vacuum and the residue taken up in 100 ml. of water. The whole is suctioned, washed with water and then with a 2% aqueous solution of sodium thiosulphate, and finally with water. The product is recrystallized from aqueous ethanol to yield 4 grams of 2-methyl-6-hydroxy-benzothiopyr-4-one, melting at 240 to 243° C. with decomposition.

The following compounds were prepared by the process described in Example 1:

(a) 6-hydroxy-benzothiopyr-4-one, melting at 238 to 240° C., from 6-methoxy-benzothiopyr-4-one, melting at 108 to 110° C.

(b) 2-n-pentyl-6-hydroxy-benzothiopyr-4-one, melting at 120 to 122° C., from 2-n-pentyl-6-methoxy-benzothiopyr-4-one, melting at 48 to 50° C.

(c) 2-methyl-7-hydroxy-benzothiopyr-4-one, melting at 179 to 184° C., from 2-methyl-7-methoxy-benzothiopyr-4-one, melting at 158 to 160° C.

(d) 8-hydroxy-benzothiopyr-4-one, melting at 230° C. with decomposition, from 8-methoxy-benzothiopyr-4-one, melting at 137 to 138° C.

(e) 2-methyl-8-hydroxy-benzothiopyr-4-one, melting at about 260° C. with decomposition, from 2-methyl-8-methoxy-benzothiopyr-4-one, melting at 109.5 to 111° C.

EXAMPLE 2

2-methyl-6,7-dihydroxy-benzothiopyr-4-one

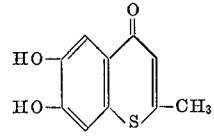

2 - methyl - 6,7 - dimethoxy-benzothiopyr-4-one (65.2 grams, melting at 160 to 165° C.) is added to 652 ml. of stabilized azeotropic hydriodic acid, and the mixture is refluxed for 4 hours, cooled, and kept overnight. The resulting precipitate is suctioned off and treated for 30 minutes with 250 ml. of water. The yellow precipitate is suctioned off and washed as described in Example 1. The dried product is recrystallized from 1250 ml. of methyl-diethyleneglycol to yield 43.3 grams of 2-methyl-6,7-dihydroxy-benzothiopyr-4-one, melting at 240° C. with decomposition.

The following were prepared by the process described in Example 2:

(a) 2-methyl-5,8-dihydroxy-benzothiopyr-4-one, melting at 270 to 272° C. with decomposition, from 2-methyl-5,8-dimethoxy-benzothiopyr-4-one, melting at 148 to 150° C.

(b) 2-n-propyl-6,7-dihydroxy-benzothiopyr-4-one, melting at 213-216° C., from 2-n-propyl-6,7-dimethoxy-benzothiopyr-4-one, melting at 95.5–98° C.

(c) 3-methyl-6,7-dihydroxy-benzothiopyr-4-one, melting at 270–276° C., from 3-methyl-6,7-dimethoxy-benzothiopyr-4-one, melting at 147–150° C. with sublimation.

(d) 2-methyl-5,7-dihydroxy-benzothiopyr-4-one, melting at 237–239° C. with sublimation, from 2-methyl-5,7-dimethoxy-benzothiopyr-4-one, melting at 127–130° C.

EXAMPLE 3

2-methyl-6,7,8-trihydroxy-benzothiopyr-4-one

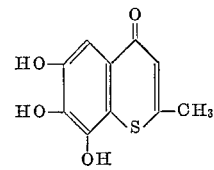

2 - methyl - 6,7,8 - trimethoxy-benzothiopyr-4-one (60 grams, melting at 132 to 136° C.) are added to 600 ml. of stabilized azeotropic hydriodic acid. The mixture is brought to a boil in an apparatus equipped with a column and a reflux head. The methyl iodide formed and the liberated water are continuously removed during the refluxing. The mixture is then cooled, allowed to stand overnight, and the precipitate then suctioned off and treated as described in Example 2. Crystallization of the dried product, from a mixture of 175 ml. of pyridine and 50 ml. of water gives 35 grams of 2-methyl-6,7,8-trihydroxy-benzothiopyr-4-one, melting above 300° C. with decomposition.

2-methyl-6,7,8-trihydroxy-benzothiopyr-4-one is also prepared as follows:

Redistilled aqueous azeotropic hydrobromic acid (1,500 ml.) and 106 g. of 2 - methyl-6,7,8-trimethoxy-benzothiopyr-4-one are maintained at reflux for 4 hours, with the water formed being eliminated. At the beginning of the reflux, the product dissolves to recrystallize as the water is progressively removed. The mixture is then allowed to stand overnight and thereafter filtered. The yellow crystals are taken up in 1.5 l. of water, filtered and washed until neutralization, suctioned off and pasted with 100 ml. of alcohol. After filtration and drying, 75 g. of product are obtained which are recrystallized in 800 ml. of a solution (60% by volume) of dimethylformamide in water. The solution is treated with carbon black, filtered, and 800 ml. of water are added to the warm solution. The product precipitates almost immediately. After standing for one night in a refrigerator, the product is suctioned off and pasted with 100 ml. of alcohol to eliminate the maximum amount of solvent of crystallization. After filtration and drying, 6.8 g. of 2-methyl - 6,7,8 - benzothiopyr - 4 - one are obtained, melting above 300° C.

By the same manner the following compound was prepared:

2-n-propyl - 6,7,8 - trihydroxy-benzothiopyr-4-one, melting at 231–236° C. (Kofler block), from 2-n-propyl-6,7,8-trimethoxy-benzothiopyr - 4 - one, melting at 70–71° C.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

What is claimed is:
1. A compound selected from the group consisting of (A) benzothiopyrone compounds of the Formula I:

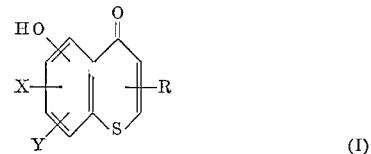

(I)

wherein:

R is selected from the group consisting of hydrogen and lower-alkyl having up to 5 carbon atoms, inclusive, X and Y are each selected from the group consisting of hydrogen and hydroxyl, and (B) physiologically acceptable salts thereof.

2. A compound of claim 1 which is 2-n-pentyl-6-hydroxy benzothiopyr-4-one.

3. A compound of claim 1 which is 2-methyl-6,7-dihydroxybenzothiopyr-4-one.

4. A compound of claim 1 which is 2-methyl-6,7,8-trihydroxy benzothiopyr-4-one.

5. A compound of claim 1 which is 3-methyl-6,7-dihydroxybenzothiopyr-4-one.

6. A compound of claim 1 which is 2-n-propyl-6,7,8-trihydroxy benzothiopyr-4-one.

References Cited

Chu et al.: Chem. Abstracts, vol. 53 (1959), p. 7161d.
Kunesch et al.: Chem. Abstracts, vol. 64 (1966), p. 4982b.

JAMES A. PATTEN, Primary Examiner

U.S. Cl. X.R.

424—275